United States Patent [19]

Wideman et al.

[11] Patent Number: 5,641,820

[45] Date of Patent: Jun. 24, 1997

[54] SILICA-FILLED RUBBER COMPOSITIONS CONTAINING DIALKYLENEAMIDE POLYSULFIDES

[75] Inventors: Lawson Gibson Wideman; Paul Harry Sandstrom, both of Tallmadge, Ohio

[73] Assignee: The Goodyear Tire & Rubber Company, Akron, Ohio

[21] Appl. No.: 578,797

[22] Filed: Dec. 26, 1995

[51] Int. Cl.$^6$ .................................................. C08L 31/04
[52] U.S. Cl. .................... 524/225; 524/392; 524/393; 524/574; 524/575; 524/575.5; 564/154; 568/22
[58] Field of Search .................................... 524/225, 392, 524/393, 574, 575, 575.5; 564/154; 568/22

[56] References Cited

U.S. PATENT DOCUMENTS

| | | | |
|---|---|---|---|
| 3,873,489 | 3/1975 | Thurn et al. | 524/393 |
| 4,735,980 | 4/1988 | Sturm et al. | 524/392 |
| 5,244,028 | 9/1993 | Segatta et al. | 524/255 |
| 5,347,015 | 9/1994 | Keller et al. | 568/22 |

FOREIGN PATENT DOCUMENTS 62-115045  5/1987  Japan .................................. 524/225

*Primary Examiner*—Mark D. Sweet
*Attorney, Agent, or Firm*—Bruce J Hendricks

[57] ABSTRACT

The present invention relates to silica-filled rubber compositions containing dialkyleneamide polysulfides of the formula $$H_2N-\overset{O}{\underset{\|}{C}}-R^1-S_x-R^1-\overset{O}{\underset{\|}{C}}-NH_2$$

where $R^1$ is independently selected from alkylene groups having 1 to 18 carbon atoms and x is an integer of from 2 to 7.

22 Claims, No Drawings

SILICA-FILLED RUBBER COMPOSITIONS CONTAINING DIALKYLENEAMIDE POLYSULFIDES

FIELD OF THE INVENTION

The present invention relates to a silica-filled rubber composition containing dialkyleneamide polysulfides and the processing of a sulfur curable rubber composition containing silica and dialkyleneamide polysulfides.

BACKGROUND OF THE INVENTION

Sulfur containing organosilicon compounds are useful as reactive coupling agents between rubber and silica fillers providing for improved physical properties. They are also useful as adhesion primers for glass, metals and other substrates.

U.S. Pat. Nos. 3,842,111, 3,873,489 and 3,978,103 disclose the preparation of various sulfur containing organosilicon compounds. These organosilicon compounds are prepared by reacting (1) 2 moles of a compound of the formula Z—Alk—hal where hal is a chlorine, bromine or iodine; Z is

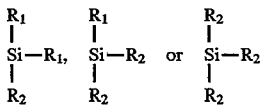

where $R_1$ is an alkyl of 1 to 4 carbon atoms or phenyl and $R_2$ is alkoxy of 1 to 8 carbon atoms; or cycloalkoxy of 5 to 8 carbon atoms; or alkylmercapto with 1 to 8 carbon atoms; Alk is a divalent aliphatic hydrocarbon or unsaturated hydrocarbon or a cyclic hydrocarbon containing 1 to 18 carbon atoms; with (2) 1 mole of a compound of the formula $Me_2S_n$ where Me is ammonium or a metal atom and n is a whole number from 2 to 6.

SUMMARY OF THE INVENTION

The present invention relates to the use of silica and dialkyleneamide polysulfides in a sulfur vulcanizable rubber.

DETAILED DESCRIPTION OF THE INVENTION

There is disclosed a method for processing a silica-filled rubber composition which comprises mixing (i) 100 parts by weight of at least one sulfur vulcanizable elastomer selected from conjugated diene homopolymers and copolymers and from copolymers of at least one conjugated diene and aromatic vinyl compound;

(ii) 10 to 250 phr of particulate precipitated silica;

(iii) 0.05 to 10 phr of a dialkyleneamide polysulfide.

There is also disclosed a silica-filled rubber composition comprising an elastomer containing olefinic unsaturation, silica and a dialkyleneamide polysulfide.

The present invention may be used to process sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90% cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The dialkyleneamide polysulfides used in the present invention are of the formula $$H_2N-\overset{O}{\overset{\|}{C}}-R^1-S_x-R^1-\overset{O}{\overset{\|}{C}}-NH_2 \qquad I$$

where $R^1$ is independently selected from alkylene groups having from 1 to 18 carbon atoms and x is an integer ranging from 2 to 7. Preferably, each $R^1$ is an alkylene group having from 1 to 6 carbon atoms and x is an integer of from 2 to 6. Depending on the method of production, the dialkyleneamide polysulfides may comprise a high purity product or mixture of products. For example, it is contemplated herein that not only high purity dialkyleneamide polysulfides of the above formula may be used but also mixtures of dialkyleneamide polysulfides of the above formula may be used, such as where some of the dialkyleneamide polysulfides have two sulfur atoms, some have four, some have six sulfur atoms and the like.

Representative of the dialkyleneamide polysulfides of formula I include bis-(propionamide) disulfide, bis-(butyramide) disulfide, bis-(pentanamide) disulfide, bis-(hexanamide) disulfide, bis-(heptanamide) disulfide, bis-(octanamide) disulfide, bis-(nonanamide) disulfide, bis-(decanamide) disulfide, bis-(undecanamide) disulfide, bis-(dodecanamide) disulfide, bis-(tridecanamide) disulfide, bis-(tetradecanamide) disulfide, bis-(pentadecanamide) disulfide, bis-(hexadecanamide) disulfide, bis-(heptadecanamide) disulfide, bis-(octadecanamide) disulfide, bis-(propionamide) trisulfide, bis-(butyramide) trisulfide, bis-(pentanamide) trisulfide, bis-(hexanamide) trisulfide, bis-(heptanamide) trisulfide, bis-(octanamide) trisulfide, bis-(nonanamide) trisulfide, bis-(decanamide) trisulfide, bis-(undecanamide) trisulfide, bis-(dodecanamide) trisulfide, bis-(tridecanamide) trisulfide, bis-(tetradecanamide) trisulfide, bis-(pentadecanamide) trisulfide, bis-(hexadecanamide) trisulfide, bis-(heptadecanamide) trisulfide, bis-(octadecanamide) trisulfide, bis-(propionamide) tetrasulfide, bis-(butyramide) tetrasulfide, bis-(pentanamide) tetrasulfide, bis-(hexanamide) tetrasulfide, bis-(heptanamide) tetrasulfide, bis-(octanamide) tetrasulfide, bis-(nonanamide) tetrasulfide, bis-(decanamide) tetrasulfide, bis-(undecanamide) tetrasulfide, bis-(dodecanamide) tetrasulfide, bis-(tridecanamide) tetrasulfide, bis-(tetradecanamide) tetrasulfide, bis-(pentadecanamide) tetrasulfide, bis-(hexadecanamide) tetrasulfide, bis-(heptadecanamide) tetrasulfide, bis-(octadecanamide) tetrasulfide, bis-(propionamide) pentasulfide, bis-(butyramide) pentasulfide, bis-(pentanamide) pentasulfide, bis-(hexanamide) pentasulfide, bis-(heptanamide) pentasulfide, bis-(octanamide) tetrasulfide, bis-(nonanamide) pentasulfide, bis-(decanamide) pentasulfide, bis-(undecanamide) pentasulfide, bis-(dodecanamide) pentasulfide, bis-(tridecanamide) pentasulfide, bis-(tetradecanamide) pentasulfide, bis-(pentadecanamide) pentasulfide, bis-(hexadecanamide) pentasulfide, bis-(heptadecanamide) pentasulfide, bis-(octadecanamide) pentasulfide, bis-(propionamide) hexasulfide, bis-(butyramide) hexasulfide, bis-(pentanamide) hexasulfide, bis-(hexanamide) hexasulfide, bis-(heptanamide) hexasulfide, bis-(octanamide) hexasulfide, bis-(nonanamide) hexasulfide, bis-(decanamide) hexasulfide, bis-(undecanamide) hexasulfide, bis-(dodecanamide) hexasulfide, bis-(tridecanamide) hexasulfide, bis-(tetradecanamide) hexasulfide, bis-(pentadecanamide) hexasulfide, bis-(hexadecanamide) hexasulfide, bis-(heptadecanamide) hexasulfide, bis-(octadecanamide) hexasulfide, bis-(propionamide) heptasulfide, bis-(butyramide) heptasulfide, bis-(pentanamide) heptasulfide, bis-(hexanamide) heptasulfide, bis-(heptanamide) heptasulfide, bis-(octanamide) heptasulfide, bis-(nonanamide) heptasulfide, bis-(decanamide) heptasulfide, bis-(undecanamide) heptasulfide, bis-(dodecanamide) heptasulfide, bis-(tridecanamide) heptasulfide, bis-(tetradecanamide) heptasulfide, bis-(pentadecanamide) heptasulfide, bis-(hexadecanamide) heptasulfide, bis-(heptadecanamide) heptasulfide and bis-(octadecanamide) heptasulfide.

The dialkyleneamide polysulfides may be prepared by reacting a compound of the formula:

$$H_2N-\overset{O}{\overset{\|}{C}}-R^1-Y \qquad II$$

where Y is a halogen selected from the group consisting of chlorine, bromine or iodine and $R^1$ is as defined above, with a compound of the formula:

$$Me_2S_x \qquad III$$

where Me is selected from the group consisting of barium, ammonium, potassium, sodium, rubidium and cesium and x is as defined above. Preferably, Me is sodium.

Example of suitable starting materials of formula III include $Na_2S_2$, $Na_2S_3$, $Na_2S_4$, $Na_2S_5$, $Na_2S_6$, $K_2S_2$, $K_2S_3$, $K_2S_4$, $K_2S_6$, $(NH_4)_2S_2$, $(NH_4)_2S_3$, $(NH_4)_2S_4$, $BaS_3$ and $BaS_4$.

The mole ratio of the compound of formula II to the compound of formula III may vary from 0.5:2 to 2:0.5. Preferably, the mole ratio ranges from 1:1 to 2:1.

Typical examples of starting materials of formula II include chloropropionamide, chlorobutyramide, chloropentanamide, chlorohexanamide, chloroheptanamide, chlorooctanamide, chlorononanamide, chlorodecanamide, chloroundecanamide, chlorododecanamide, chlorotridecanamide, chlorotetradecanamide, chloropentadecanamide, chlorohexadecanamide, chloroheptadecanamide, chlorooctadecanamide, bromopropionamide, bromobutyramide, bromopentanamide, bromohexanamide, bromoheptanamide, bromooctanamide, bromononanamide, bromodecanamide, bromoundecanamide, bromododecanamide, bromotridecanamide, bromotetradecanamide, romopentadecanamide, bromohexadecanamide, romoheptadecanamide, bromooctadecanamide, iodopropionamide, iodobutyramide, iodopentanamide, iodohexanamide, iodoheptanamide, iodooctanamide, iodononanamide, iododecanamide, iodoundecanamide, iodododecanamide, iodotridecanamide, iodotetradecanamide, iodopentadecanamide, iodohexadecanamide, iodoheptadecanamide and iodooctadecanamide.

As can be appreciated by those skilled in the art, the halogen may be substituted at various locations. Substitution at the terminal carbon atom is preferred.

The temperature at which the reaction between the materials of formula II and formula III is not critical. The reaction is generally conducted at a temperature between 30° C. and 120° C. Preferably, the temperature ranges between 30° C. and 95° C.

The reaction is generally conducted in the presence of a suitable solvent. Aqueous or organic solvents may be used. The primary criteria is to use a solvent which does not react with the starting materials or end product. Representative organic solvents include chloroform, dichloromethane, carbon tetrachloride, hexane, heptane, cyclohexane, xylene, benzene, toluene, aliphatic and cycloaliphatic alcohols. Preferably, water is used for easy of removal during the reaction and safety.

The dialkyleneamide polysulfide used in the present invention may be added to the rubber by any conventional technique such as on a mill or in a Banbury. The amount of dialkyleneamide polysulfide may vary widely depending on the type of rubber and other compounds present in the vulcanizable composition. Generally, the amount of dialkyleneamide polysulfide is used in a range of from about 0.05 to about 10.0 phr with a range of 0.1 to about 5.0 phr being preferred. The dialkyleneamide polysulfide is preferably added in the nonproductive stage with the silica and optional sulfur-containing organosilicon coupling agent.

For ease in handling, the dialkyleneamide polysulfide may be used per se or may be deposited on suitable carriers. Examples of carriers which may be used in the present invention include silica, carbon black, alumina, kieselguhr, silica gel and calcium silicate.

The rubber composition should contain a sufficient amount of silica, and carbon black, if used, to contribute a reasonably high modulus and high resistance to tear. The silica filler may be added in amounts ranging from 10 to 250 phr. Preferably, the silica is present in an amount ranging from 15 to 80 phr. If carbon black is also present, the amount of carbon black, if used, may vary. Generally speaking, the amount of carbon black will vary from 0 to 80 phr. Preferably, the amount of carbon black will range from 0 to 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 5:1. The combined weight of the silica and carbon black, as herein referenced, may be as low as about 30 phr, but is preferably from about 45 to about 90 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Whereas the dialkyleneamide polysulfide functions as a silica coupling agent, the processing of the sulfur vulcanizable rubber may be conducted in the presence of a sulfur containing organosilicon compound. Examples of suitable sulfur containing organosilicon compounds are of the formula:

in which Z is selected from the group consisting of

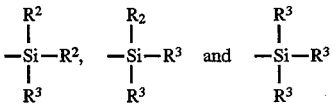

where $R^2$ is an alkyl group of 1 to 4 carbon atoms, cyclohexyl or phenyl;

$R^3$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxysilylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore as to formula IV, preferably Z is

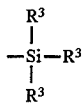

where $R^3$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula IV in a rubber composition will vary depending on the level of silica that is used. Generally speaking, the amount of the compound of formula IV, if used, will range from 0.01 to 1.0 parts by weight per part by weight of the silica. Preferably, the amount will range from 0.05 to 0.4 parts by weight per part by weight of the silica.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene accepted (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

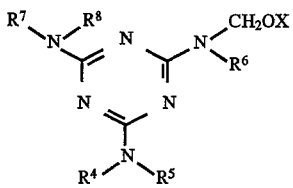

wherein X is an alkyl having from 1 to 8 carbon atoms, $R^4$, $R^5$, $R^6$, $R^7$ and $R^8$ are individually selected from the group consisting of hydrogen, an alkyl having from 1 to 8 carbon atoms and the group —$CH_2OX$. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica, dialkyleneamide polysulfide and carbon black, if used, are mixed in one or more non-productive mix stages. The terms "non-productive" and "productive" mix stages are well known to those having skill in the rubber mixing art. The sulfur vulcanizable rubber composition containing the dialkyleneamide polysulfide, vulcanizable rubber and generally at least part of the silica should, as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The invention may be better understood by reference to the following examples in which the parts and percentages are by weight unless otherwise indicated.

EXAMPLE 1

Preparation of 3,3'-tetrathiodipropionamide

A 500-ml round-bottom 3-neck flask was equipped with a mechanical stirrer, thermocouple and a water condenser mounted with a dropping funnel. The reaction flask was swept with nitrogen and charged with 43.0 g (0.40 mole) of 3-chloropropionamide and 200 ml of distilled water with vigorous stirring. An aqueous solution (100 g) of $Na_2S_4$ (34%) (0.20 mole) was added dropwise over a period of several minutes with no apparent exotherm showing. The reaction mixture was slowly heated to 80° C. over about ½ hour with vigorous stirring under nitrogen. The system was stirred for an additional hour, and it was allowed to slowly cool to room temperature, about 1 hour. The flask and thick white precipitate were cooled in a water bath, suction filtered and air-dried to give 49 g of an off-white powder, mp 127°

C. The product was confirmed by Field Desorption Mass Spectrometric analysis which showed the presence of the $S_2$ through $S_7$ polysulfides of dipropionamide. The polysulfide distribution was 20.6 percent by weight $S_2$, 41.3 percent by weight $S_3$, 25.2 percent by weight $S_4$, 9.3 percent by weight $S_5$, 2.3 percent by weight $S_6$ and 1.2 percent by weight $S_7$.

EXAMPLE II

In this example, the dialkylene polysulfide product prepared in Example 1 was evaluated in comparison with a commercially-available silica coupling agent, namely, bis-(3-triethoxysilylpropyl)tetrasulfide.

Rubber compositions containing the materials set out in Tables 1 and 2 were prepared in a BR Banbury™ mixer using three separate stages of addition (mixing), namely, two non-productive mix stages and one productive mix stage. The first non-productive stage was mixed for up to 4 minmutes or to a rubber temperature of 160° C. whichever occurred first. The second non-productive stage was mixed for 7 minutes at 160° C. The mixing time for the productive stage was to a rubber temperature of 120° C. for 2 minutes.

The rubber compositions are identified herein as Samples 1–3. Samples 1 and 2 are considered herein as being controls without the use of a dialkyleneamide polysulfide added during the nonproductive mixing stage.

The samples were cured at about 150° C. for about 18 minutes.

Table 2 illustrates the behavior and physical properties of the cured samples 1–3.

It is clearly evident from the results that the use of dialkyleneamide polysulfides results in higher modulus, hardness properties (at room temperature) and rebound values than the controls.

TABLE 1

|  | Ex. 1 | Ex. 2 | Ex. 3 |
| --- | --- | --- | --- |
| First Non-Productive | | | |
| Polyisoprene[1] | 100 | 100 | 100 |
| Carbon Black | 35 | 35 | 35 |
| Processing Oil | 5 | 5 | 5 |
| Zinc Oxide | 5 | 5 | 5 |
| Fatty Acid | 2 | 2 | 2 |
| Antioxidant[2] | | | |
| Second Non-Productive | | | |
| 1st Non-Productive | 149 | 149 | 149 |
| Silica[3] | 15 | 15 | 15 |
| Silica Coupling Agent[4] | 0 | 3 | 0 |
| Dialkyleneamide Polysulfide[5] | 0 | 0 | 2 |
| Productive | | | |
| Second Non-Productive | 164 | 167 | 167 |
| Sulfur | 1.4 | 1.4 | 1.4 |
| Accelerator[6] | 1 | 1 | 1 |

[1]Synthetic cis 1,4-polyisoprene which is commercially available from The Goodyear Tire & Rubber Company under the designation Natsyn ® 2200
[2]Polymerized 1,2-dihydro 2,2,4-trimethylquinoline type
[3]Precipitated silica which is commercially available from the PPG Company under the designation Hil Sil™ 210
[4]Obtained as bis-(3-triethoxysilylpropyl) tetrasulfide, which is commercially available as X50S from Degussa Gmbh and is provided in a 50/50 by weight blend with carbon black.
[5]As prepared in Example 1
[6]Sulfenamide type

TABLE 2

|  | Samples | | |
| --- | --- | --- | --- |
|  | 1 | 2 | 3 |
| Dialkyleneamide Polysulfide | 0 | 0 | 2 |
| Bis-(3-triethoxysilylpropyl) tetrasulfide | 0 | 3 | 0 |
| Rheometer, 150° C. | | | |
| Max Torque | 28.4 | 32.0 | 39.0 |
| Min Torque | 8.1 | 7.6 | 8.5 |
| Delta Torque | 20.3 | 24.4 | 30.5 |
| T90 | 23.8 | 20.0 | 13.0 |
| T25 | 17.5 | 13.8 | 3.5 |
| Stress Strain 36' @ 150° C. | | | |
| 100% M (MPa) | 1.17 | 1.64 | 1.94 |
| 300% M (MPa) | 5.36 | 8.21 | 9.25 |
| Tensile Strength (MPa) | 16.99 | 19.69 | 20.65 |
| Elongation @ Break (%) | 628 | 590 | 546 |
| 300%/100% Modulus | 4.58 | 5.01 | 4.77 |
| Hardness | | | |
| RT | 48.9 | 54.8 | 60.5 |
| 100 C. | 46.8 | 52.9 | 52.8 |
| Rebound | | | |
| RT | 46.0 | 49.2 | 53.2 |
| 100 C. | 58.3 | 62.3 | 63.2 |
| Rheovibron, 60° C. | | | |
| E', MPa | 8.21 | 9.72 | 13.32 |
| Tan Delta | .106 | .100 | .078 |
| DIN Abrasion (lower is better) | 249 | 157 | 153 |

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a silica-filled rubber composition which comprises mixing
   (i) 100 parts by weight of at least one sulfur vulcanizable elastomer selected from conjugated diene homopolymers and copolymers and from copolymers of at least one conjugated diene and aromatic vinyl compound;
   (ii) 10 to 250 phr of particulate precipitated silica;
   (iii) 0.05 to 10 phr of a dialkyleneamide polysulfide.

2. The method of claim 1 wherein said dialkyleneamide polysulfide is added in an amount ranging from 0.10 to 5.0 phr.

3. The method of claim 1 wherein said dialkyleneamide polysulfide is of the formula:

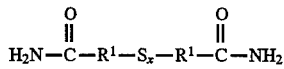

where $R^1$ is independently selected from alkylene groups having from 1 to 18 carbon atoms and x is an integer ranging from 2 to 7.

4. The method of claim 3 wherein said dialkyleneamide polysulfide is selected from the group consisting of bis-(propionamide) disulfide, bis-(butyramide) disulfide, bis-(pentanamide) disulfide, bis-(hexanamide) disulfide, bis-(heptanamide) disulfide, bis-(octanamide) disulfide, bis-(nonanamide) disulfide, bis-(decanamide) disulfide, bis-(undecanamide) disulfide, bis-(dodecanamide) disulfide, bis-(tridecanamide) disulfide, bis-(tetradecanamide) disulfide, bis-(pentadecanamide) disulfide, bis-(hexadecanamide) disulfide, bis-(heptadecanamide) disulfide, bis-(octadecanamide) disulfide, bis- (propionamide) trisulfide, bis-(butyramide) trisulfide, bis-(pentanamide) trisulfide, bis-(hexanamide) trisulfide, bis-(heptanamide) trisulfide, bis-(octanamide) trisulfide, bis-(nonanamide) trisulfide, bis-(decanamide) trisulfide, bis-(undecanamide) trisulfide, bis-(dodecanamide) trisulfide, bis-(tridecanamide) trisulfide, bis-(tetradecanamide) trisulfide, bis-(pentadecanamide) trisulfide, bis-(hexadecanamide) trisulfide, bis-(heptadecanamide) trisulfide, bis-(octadecanamide) trisulfide, bis-(propionamide) tetrasulfide, bis-(butyramide) tetrasulfide, bis-(pentanamide) tetrasulfide, bis-(hexanamide) tetrasulfide, bis-(heptanamide) tetrasulfide, bis-(octanamide) tetrasulfide, bis-(nonanamide) tetrasulfide, bis-(decanamide) tetrasulfide, bis-(undecanamide) tetrasulfide, bis-(dodecanamide) tetrasulfide, bis-(tridecanamide) tetrasulfide, bis-(tetradecanamide) tetrasulfide, bis-(pentadecanamide) tetrasulfide, bis-(hexadecanamide) tetrasulfide, bis-(heptadecanamide) tetrasulfide, bis-(octadecanamide) tetrasulfide, bis-(propionamide) pentasulfide, bis-(butyramide) pentasulfide, bis-(pentanamide) pentasulfide, bis-(hexanamide) pentasulfide, bis-(heptanamide) pentasulfide, bis-(octanamide) tetrasulfide, bis-(nonanamide) pentasulfide, bis-(decanamide) pentasulfide, bis-(undecanamide) pentasulfide, bis-(dodecanamide) pentasulfide, bis-(tridecanamide) pentasulfide, bis-(tetradecanamide) pentasulfide, bis-(pentadecanamide) pentasulfide, bis-(hexadecanamide) pentasulfide, bis-(heptadecanamide) pentasulfide, bis-(octadecanamide) pentasulfide, bis-(propionamide) hexasulfide, bis-(butyramide) hexasulfide, bis-(pentanamide) hexasulfide, bis-(hexanamide) hexasulfide, bis-(heptanamide) hexasulfide, bis-(octanamide) hexasulfide, bis-(nonanamide) hexasulfide, bis-(decanamide) hexasulfide, bis-(undecanamide) hexasulfide, bis-(dodecanamide) hexasulfide, bis-(tridecanamide) hexasulfide, bis-(tetradecanamide) hexasulfide, bis-(pentadecanamide) hexasulfide, bis-(hexadecanamide) hexasulfide, bis-(heptadecanamide) hexasulfide, bis-(octadecanamide) hexasulfide, bis-(propionamide) heptasulfide, bis-(butyramide) heptasulfide, bis-(pentanamide) heptasulfide, bis-(hexanamide) heptasulfide, bis-(heptanamide) heptasulfide, bis-(octanamide) heptasulfide, bis-(nonanamide) heptasulfide, bis-(decanamide) heptasulfide, bis-(undecanamide) heptasulfide, bis-(dodecanamide) heptasulfide, bis-(tridecanamide) heptasulfide, bis-(tetradecanamide) heptasulfide, bis-(pentadecanamide) heptasulfide, bis-(hexadecanamide) heptasulfide, bis-(heptadecanamide) heptasulfide and bis-(octadecanamide) heptasulfide.

5. The method of claim 1 wherein a sulfur containing organosilicon compound is present and is of the formula:

Z—Alk—$S_n$—Alk—Z in which Z is selected from the group consisting of

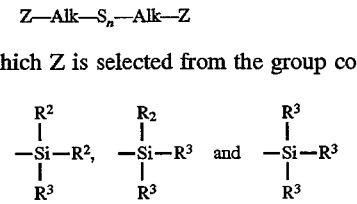

where $R^2$ is an alkyl group of 1 to 4 carbon atoms, cyclohexyl or phenyl;

$R^3$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

6. The method of claim 5 wherein sulfur containing organosilicon compound is present in an amount ranging from 0.01 to 1.0 parts by weight per part by weight of the silica.

7. The method of claim 1 wherein a silica filler is added to said vulcanizable rubber composition in an amount ranging from 15 to 80 phr.

8. The method of claim 1 wherein said sulfur vulcanizable elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

9. The method of claim 1 wherein said silica-filled rubber composition is thermomechanically mixed at a rubber temperature in a range of from 140° C. to 190° C. for a mixing time of from 1 to 20 minutes.

10. A sulfur vulcanizable rubber composition comprising an elastomer containing olefinic unsaturation, silica and a dialkyleneamide polysulfide.

11. The composition of claim 10 wherein said dialkyleneamide polysulfide is present in an amount ranging from 0.05 to 10.0 phr.

12. The composition of claim 10 wherein said dialkyleneamide polysulfide is of the formula:

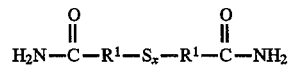

where $R^1$ is independently selected from alkylene groups having from 1 to 18 carbon atoms and x is an integer ranging from 2 to 7.

13. The composition of claim 10 wherein said dialkyleneamide polysulfide is selected from the group consisting of bis-(propionamide) disulfide, bis-(butyramide) disulfide, bis-(pentanamide) disulfide, bis-(hexanamide) disulfide, bis-(heptanamide) disulfide, bis-(octanamide) disulfide, bis-(nonanamide) disulfide, bis-(decanamide) disulfide, bis-(undecanamide) disulfide, bis-(dodecanamide) disulfide, bis-(tridecanamide) disulfide, bis-(tetradecanamide) disulfide, bis-(pentadecanamide) disulfide, bis-(hexadecanamide) disulfide, bis-(heptadecanamide) disulfide, bis-(octadecanamide) disulfide, bis-(propionamide) trisulfide, bis-(butyramide) trisulfide, bis-(pentanamide) trisulfide, bis-(hexanamide) trisulfide, bis-(heptanamide) trisulfide, bis-(octanamide) trisulfide, bis-(nonanamide) trisulfide, bis-(decanamide) trisulfide, bis-(undecanamide) trisulfide, bis-(dodecanamide) trisulfide, bis-(tridecanamide) trisulfide, bis-(tetradecanamide) trisulfide, bis-(pentadecanamide) trisulfide, bis-(hexadecanamide) trisulfide, bis-(heptadecanamide) trisulfide, bis-(octadecanamide) trisulfide, bis-(propionamide) tetrasulfide, bis-(butyramide) tetrasulfide, bis-(pentanamide) tetrasulfide, bis-(hexanamide) tetrasulfide, bis-(heptanamide) tetrasulfide, bis-(octanamide) tetrasulfide, bis-(nonanamide) tetrasulfide, bis-(decanamide) tetrasulfide, bis-(undecanamide) tetrasulfide, bis-(dodecanamide) tetrasulfide, bis-(tridecanamide) tetrasulfide, bis-(tetradecanamide) tetrasulfide, bis-(pentadecanamide) tetrasulfide, bis-(hexadecanamide) tetrasulfide, bis-(heptadecanamide) tetrasulfide, bis-(octadecanamide) tetrasulfide, bis-(propionamide) pentasulfide, bis-(butyramide) pentasulfide, bis-(pentanamide) pentasulfide, bis-(hexanamide)

pentasulfide, bis-(heptanamide) pentasulfide, bis-(octanamide) tetrasulfide, bis-(nonanamide) pentasulfide, bis-(decanamide) pentasulfide, bis-(undecanamide) pentasulfide, bis-(dodecanamide) pentasulfide, bis-(tridecanamide) pentasulfide, bis-(tetradecanamide) pentasulfide, bis-(pentadecanamide) pentasulfide, bis-(hexadecanamide) pentasulfide, bis-(heptadecanamide) pentasulfide, bis-(octadecanamide) pentasulfide, bis-(propionamide) hexasulfide, bis-(butyramide) hexasulfide, bis-(pentanamide) hexasulfide, bis-(hexanamide) hexasulfide, bis-(heptanamide) hexasulfide, bis-(octanamide) hexasulfide, bis-(nonanamide) hexasulfide, bis-(decanamide) hexasulfide, bis-(undecanamide) hexasulfide, bis-(dodecanamide) hexasulfide, bis-(tridecanamide) hexasulfide, bis-(tetradecanamide) hexasulfide, bis-(pentadecanamide) hexasulfide, bis-(hexadecanamide) hexasulfide, bis-(heptadecanamide) hexasulfide, bis-(octadecanamide) hexasulfide, bis-(propionamide) heptasulfide, bis-(butyramide) heptasulfide, bis-(pentanamide) heptasulfide, bis-(hexanamide) heptasulfide, bis-(heptanamide) heptasulfide, bis-(octanamide) heptasulfide, bis-(nonanamide) heptasulfide, bis-(decanamide) heptasulfide, bis-(undecanamide) heptasulfide, bis-(dodecanamide) heptasulfide, bis-(tridecanamide) heptasulfide, bis-(tetradecanamide) heptasulfide, bis-(pentadecanamide) heptasulfide, bis-(hexadecanamide) heptasulfide, bis-(heptadecanamide) heptasulfide and bis-(octadecanamide) heptasulfide.

14. The composition of claim 10 wherein a sulfur containing organosilicon compound is present and is of the formula:

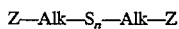

in which Z is selected from the group consisting of

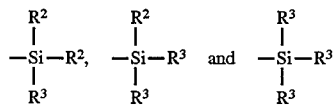

where $R^2$ is an alkyl group of 1 to 4 carbon atoms, cyclohexyl or phenyl;

$R^3$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

15. The composition of claim 14 wherein sulfur containing organosilicon compound is present in an amount ranging from 0.01 to 1.0 parts by weight per part by weight of said silica.

16. The composition of claim 9 wherein said silica is present in an amount ranging from 10 to 250 phr.

17. The composition of claim 16 wherein a silica filler is used in an amount ranging from 15 to 80 phr.

18. The composition of claim 10 wherein said elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

19. The composition of claim 10 wherein said composition is thermomechanically mixed at a rubber temperature in a range of from 140° C. to 190° C. for a total mixing time of from 1 to 20 minutes.

20. A sulfur vulcanized rubber composition which is prepared by heating the composition of claim 10 to a temperature ranging from 100° C. to 200° C. in the presence of a sulfur vulcanizing agent.

21. The sulfur vulcanized rubber composition of claim 20 in the form of a tire, belt or hose.

22. A tire having a tread comprised of the composition of claim 20.

* * * * *